United States Patent [19]

Berger et al.

[11] Patent Number: 4,753,311
[45] Date of Patent: Jun. 28, 1988

[54] HYDROSTATIC TRANSLATION SLIDE SUPPORT

[75] Inventors: Bernd Berger, Karl Marx Stadt; Christian Zschocke, Erdmannsdorf-Augustusburg, both of German Democratic Rep.

[73] Assignee: Bauakademie der Deutschen Demokratischen Republik, Berlin, German Democratic Rep.

[21] Appl. No.: 905,664

[22] Filed: Sep. 8, 1986

[30] Foreign Application Priority Data

Sep. 6, 1985 [DD] German Democratic Rep. ... 280390

[51] Int. Cl.$^4$ ................................................ B60V 1/00
[52] U.S. Cl. .................................... 180/125; 180/130
[58] Field of Search ............... 180/116, 122, 124, 125, 180/127, 128, 129, 130; 384/12

[56] References Cited

U.S. PATENT DOCUMENTS

| | | | |
|---|---|---|---|
| 3,373,840 | 3/1968 | Kilmer | 180/124 |
| 3,610,365 | 10/1971 | Maddox | 180/127 |
| 4,453,612 | 6/1984 | Balandin | 180/124 |
| 4,538,699 | 9/1985 | Kutscher | 180/125 |

FOREIGN PATENT DOCUMENTS 2266620 10/1975 France .................................. 180/124

*Primary Examiner*—John J. Love
*Assistant Examiner*—Everett G. Diederiks, Jr.
*Attorney, Agent, or Firm*—Michael J. Striker

[57] ABSTRACT

A hydrostatic translation slide support, comprises a housing, a slide member, a low pressure chamber and a high pressure chamber, a support ring which is elastically held against the housing and pressed with a uniform tensioning against the slide member, the support ring being movable in the housing substantial normal to the slide member, a first sealing ring fixedly held by the support ring and located between the support ring and the slide member to limit the high pressure chamber, a second double lip sealing ring arranged in the housing and surrounding the support ring so as to limit the low pressure chamber, means forming a supply passage in the housing for supplying a hydraulic medium into the high pressure chamber, and means forming a discharge passage for withdrawing the pressure medium from the low pressure chamber.

5 Claims, 1 Drawing Sheet

HYDROSTATIC TRANSLATION SLIDE SUPPORT

BACKGROUND OF THE INVENTION

The present invention relates to a hydrostatic translation slide support with small supporting surfaces for supporting heavy loads, for example for heavy load transportation systems with a plurality of load applications.

Hydrostatic axial supports or bearings are known which are formed rigid with pressure up to 5 MPa, independently of the massive support shoe articulately mounted as a plate. A supplied pressure fluid flows out through a formed sealing gap. The load floats on this hydrostatic support in a friction-free manner. However, this support has a limited adjusting possibility during load-dependent deformation of the structural parts. The articulately connected spherical connections provided on such a bearing shoe do not eliminate this disadvantage. The flexibility of the support for location-changeable transportation systems with the required structural mass reduction is not sufficient. Rigidity of this support depends upon dynamic conditions of the fluid throughflow of the mass point distribution and the rigidity of the structural elements.

German document DE-OS No. 2,202,381 discloses a hydrostatic support element in which a pocket support which supports an oil pocket via a spherical circular ring surface, is connected with a piston guided in a cylinder and provided with a central oil through opening. The cylinder which has a fine thread on its outer surface is screwed in the support ring and closed by a flange. The oil pocket is easily pre-tensioned relative to the pocket support by means of the through-going screw bore and via an elastic intermediate ring. The disadvantage of this support element is that it is provided only a stationary support and cannot be used for translation movements.

SUMMARY OF THE INVENTION

Accordingly, it is an object of the present invention to provide a hydrostatic translation slide support which avoids the disadvantages of the prior art.

More particularly, it is an object of the present invention to provide a translation slide support which has small supporting surfaces for low-friction translation of heavy loads which in the event of a high number of load applications guarantees a sufficient flexibility in the sealing region to prevent leakages during elastic deformation of sliding pairs.

It is also an object of the present invention to provide a hydrostatic translation slide support with small supporting surfaces for transporting heavy loads, which is suitable for swinging translation movements, and in which the supporting surfaces are elastically deformable and the support can function when the sealing ring is tilted.

In keeping with these objects and with others which will become apparent hereinafter, one feature of the present invention resides, briefly stated, in a translation slide support in which a first sealing ring is fixedly held in a supporting ring which is held elastically against a housing and pressed with a uniform pretensioning against a slide member, the support ring is arranged movable relative to the housing substantially normally to the slide member and sealed from a low pressure chamber in a fluid-tight and pressure-tight manner by a second sealing ring which surrounds the support ring and is accommodated in the housing, a supply passage leads a pressure medium through the housing from a hydraulic pump to a high pressure chamber, and a discharge passage leads from the low pressure chamber to a container, the support ring is also surrounded by a double lip ring which is arranged in the housing and is located at a distance from the low pressure chamber.

The movement of the support ring substantially normal to the slide member can be performed by means of a centrally arranged closing plate.

The pressing of the support ring elastically relative to the housing and in a pre-tensioned manner relative to the slide member is performed by means of pressure springs.

The first sealing ring can be formed so that it is reinforced at its lower side.

Finally, the height of the stroke of the supporting ring relative to the housing can be selected so that it is equal to the difference between the length of a leg of the closing plate and the width of a flange of an inner ring of the support ring, and also greater than the axial deformation of the first sealing ring.

The advantage of the translation slide support in accordance with the present invention is that it is suitable for swinging translation movements. By the movable support ring, a flexible reaction is guaranteed. Waviness on a working surface of the slide member can be compensated without affecting the operation. Because of a very high pressure, the high loads can be supported on a very small surface. The lubrication channel guarantees that the sealing ring is always lubricated.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF A PREFERRED EMBODIMENT

Figure 1:
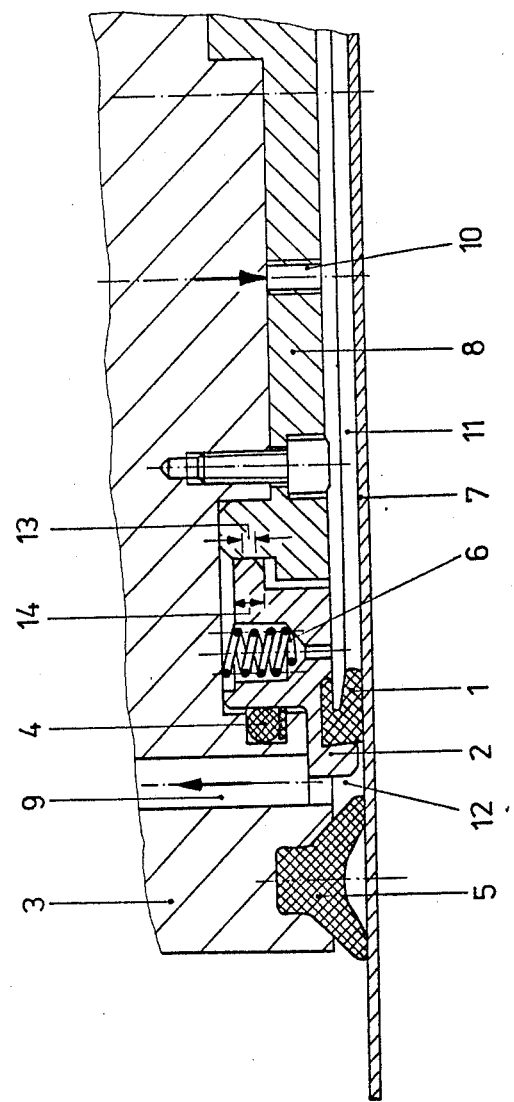
FIG. 1 of the drawing is a view showing a transverse cross section of a translation slide support in accordance with the present invention.

A translation slide support in accordance with the present invention has a selaing element which is designed in accordance with the desired functions of the support and is formed as a sealing ring 1, for example a radial lip ring with a reinforced (thicker) lower shoulder. The support is provided with a support ring 2, and the sealing ring 1 is embedded in the support ring 2.

The translation slide support of the invention further has a housing 3. A slide member of the support is identified with reference numeral 7. The supporting ring 2 and the sealing ring 1 are pressed by pressure springs 6 away from the housing 3 with a uniform pre-tensioning against the slide member 7. The support ring 2 is arranged movably on the housing 3 in a direction normal to the slide member 7 being guided, by a centrally arranged closing plate 8.

A sealing ring 4 is further received in the housing 3. The sealing ring 4 surrounds the support ring 2 and seals the support ring in its upper region from a low pressure chamber 12 in a fluid-tight and pressure-tight manner. A supply passage 10 is provided in the housing 3. A medium is supplied from a hydraulic pump through the supply passage 10 to a high pressure chamber 11. A discharge passage 9 provided in the housing 3 opens into the low pressure chamber 12 and guides the leakage of the medium to a container.

The supporting ring 2 and a sealing ring 5 which is arranged at a distance to the supporting ring 2 in the housing 3, limit the low pressure chamber 12. The sealing ring 5 can be formed, for example, as a double-lip ring. The height of the stroke of the support ring 2 relative to the housing 3 is equal to the difference of a leg length 13 of the closing plate 8 and the flange width of an inner ring 14. It is greater than the axial deformation of the support ring 1 during loading.

During loading, the medium flowing through the supply passage 10 is supplied into the high pressure chamber 11. By pressing the sealing ring 1 against the slide member 7 by the pressure spring 6 and by the inner pressure in the high pressure chamber 11 which acts on the thick lower shoulder of the sealing ring 1, the medium is prevented from being discharged so as to form a hydrostatic slide bearing. The deformation of the sealing ring 1 is compensated by the stroke of the support ring 2 outwardly. Because of the elasticity of the structure, unevenness of the slide member 7 no longer matters. Leakage which discharges between the sealing ring 1 and the slide member 7 is accumulated in the low pressure chamber 12, and great quantities can be discharged via the discharge passage 9. The quantity of medium which remains in the low pressure chamber 12 serves during radial movement of the support as a lubricant of the sealing ring 1. The outer lips of the double lip ring 5 prevent penetration of dust into the support.

It will be understood that each of the elements described above, or two or more together, may also find a useful application in other types of constructions differing from the types described above.

While the invention has been illustrated and described as embodied in a hydrostatic translation slide support, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A hydrostatic translation slide support, comprising: a housing; a slide member; a low pressure chamber and a high pressure chamber; a support ring having a portion located within said housing, said support ring being elastically held away from said housing and pressed with a uniform pre-tensioning against said slide member by means mounted between said housing and said support ring, said support ring being movable in said housing substantially normal to said slide member; a first sealing ring fixedly held by said support ring and located between said support ring and said slide member, said first sealing ring outwardly limiting said high pressure chamber therewithin; a second, double lip sealing ring secured to said housing and surrounding said support ring, said low pressure chamber being limited by and located between said first and second sealing rings; means forming a supply passage in said housing for supplying a hydraulic medium into said high pressure chamber; means forming a discharge passage in said housing for withdrawing the hydraulic medium from said low pressure chamber; and a third sealing ring arranged in said housing and surrounding said portion of said support ring thereby forming a fluid-tight and pressure-tight seal between said housing and said support ring.

2. A hydraulic translation slide support as defined in claim 1 wherein said means which elastically holds and uniformly pre-tensions said support ring comprises at least one pressure spring arranged to elastically bias said support ring away from said housing and to press said support ring with uniform pretensioning against said slide member.

3. A hydrostatic translation slide support as defined in claim 1; and further comprising a centrally arranged closing plate which centrally guides said support ring while allowing movement relative to said housing normally to said slide member.

4. A hydrostatic translation slide support as defined in claim 3, wherein said closing plate has a leg with a predetermined length, said support ring having a flange with a predetermined height, said first sealing ring having a predetermined axial deformation under load, said support ring being movable relative to said housing with a stroke having a height equal to a difference between said length of said leg of said closing plate and said height of said flange of said support ring.

5. A hydrostatic translation slide support as defined in claim 1, wherein said first sealing ring has a lower side facing toward said slide member and is provided with a thick shoulder at said lower side so as to reinforce said lower side.

* * * * *